US010359514B2

(12) United States Patent
Hagerman et al.

(10) Patent No.: US 10,359,514 B2
(45) Date of Patent: Jul. 23, 2019

(54) GENERATING ESTIMATES OF UNCERTAINTY FOR RADAR BASED PRECIPITATION ESTIMATES

(71) Applicant: THE CLIMATE CORPORATION, San Francisco, CA (US)

(72) Inventors: Bryson Hagerman, Oakland, CA (US); Drew O'Kane, Concord, CA (US)

(73) Assignee: The Climate Corporation, San Francisco, CA (US)

( * ) Notice: Subject to any disclaimer, the term of this patent is extended or adjusted under 35 U.S.C. 154(b) by 847 days.

(21) Appl. No.: 14/965,789

(22) Filed: Dec. 10, 2015

(65) Prior Publication Data
US 2017/0168157 A1    Jun. 15, 2017

(51) Int. Cl.
*G01S 13/95*    (2006.01)
*G01W 1/14*    (2006.01)

(52) U.S. Cl.
CPC ............. *G01S 13/958* (2013.01); *G01W 1/14* (2013.01); *Y02A 90/18* (2018.01)

(58) Field of Classification Search
CPC ......... G01S 13/958; G01W 1/14; Y02A 90/18
USPC .................. 702/3, 181; 342/26 R; 701/1
See application file for complete search history.

(56) References Cited

U.S. PATENT DOCUMENTS

| 6,581,009 | B1 | 6/2003 | Smith | |
|---|---|---|---|---|
| 9,187,099 | B2 * | 11/2015 | Powers | B60W 40/06 |
| 2009/0160700 | A1 * | 6/2009 | Messer-Yaron | G01W 1/02 342/26 R |
| 2013/0332111 | A1 | 12/2013 | McLaughlin et al. | |

FOREIGN PATENT DOCUMENTS

WO    WO 2005/092028 A2    10/2005

OTHER PUBLICATIONS

International Searching Uthority, "Search Report" in application No. PCT/US16/62014, dated Jan. 31, 2017, 8 pages.
Current Claims in application No. PCT/US16/62014, dated Jan. 2017, 11 pages.
International Searching Authority, "Search Report" in application No. PCT/US16/62014, dated Jan. 31, 2017, 15 pages.

* cited by examiner

*Primary Examiner* — John H Le
(74) *Attorney, Agent, or Firm* — Elliot H. Karlin; Hickman Palermo Becker Bingham LLP

(57) ABSTRACT

A method and system for estimating uncertainties in radar based precipitation estimates is provided. In an embodiment, gauge measurements at one or more gauge locations are received by an agricultural intelligence computer system. The agricultural intelligence computer system obtains precipitation estimates for the one or more gauge locations that correspond to the gauge measurements and computes the differences between the precipitation estimates and the gauge measurements. Using the precipitation estimates and the computed differences, the agricultural intelligence computer system then models a dependence of the uncertainty in the precipitation estimates on the value of the precipitation estimates. When the agricultural intelligence computer system receives precipitation estimates for a location where gauge measurements are unavailable, the agricultural intelligence computer identifies an uncertainty for the precipitation estimate based on the value of the precipitation estimate and the model of the dependence of the uncertainty on the precipitation estimate values.

21 Claims, 7 Drawing Sheets

(a)

(b)

GENERATING ESTIMATES OF UNCERTAINTY FOR RADAR BASED PRECIPITATION ESTIMATES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure generally relates to computer systems useful in climatology and agriculture. The disclosure relates more specifically to computer systems that are programmed or configured to generate estimates of uncertainty in precipitation estimates that are created using radar devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Water, often received via rain or other precipitation, is an essential element to life. For farmers, rainfall is a large factor in determining how much water a crop receives, thereby altering the potential yield for the crop. While rainfall has many positive effects, such as giving life to crops, large quantities of rainfall can also have severe repercussions, such as by causing floods or resulting in standing or ponding water that can inundate seedlings or mature crops. Thus, accurate measurements of rainfall can be extremely important, both to maximize gains from the rainfall and minimize risks from an overabundance of rainfall.

Rainfall is generally measured using one of two approaches. One approach for measuring rainfall involves utilizing physically placed rain gauges. The rain gauges are set at a variety of locations and are used to gather precipitation and measure the amount of precipitation received at the rain gauge over a period of time. While rain gauges create accurate measurements of the amount of precipitation received at the rain gauge, rain gauge data is only available where a rain gauge has been physically placed. Precipitation amounts in non-gauge locations may be inferred from the measurements at surrounding gauge locations, but the inferred precipitation amounts do not contain the same levels of accuracy as the gauge measurements.

A second approach to measuring rainfall involves utilizing radar data to calculate the rainfall. Generally, a polarized beam of energy is emitted from a radar device in a particular direction. The beam travels un-disturbed before encountering a volume of air containing hydrometeors, such as rainfall, snowfall, or hail, which causes the beam to scatter energy back to a radar receiver. Based on the amount of time it takes for a radar beam to return, the distance between the radar device and the volume of air containing hydrometeors is computed. The amount of energy that is received by the radar receiver, also known as the reflectivity, is used to compute the rainfall rate. Often, the relationship between the reflectivity and the actual rainfall rate is modeled through the Z-R transformation:

$$Z=aR^b$$

where Z is the reflectivity and R is the actual rainfall rate. The parameters for the Z-R transformation may be identified through measurements for rain gauges for a particular area and type of storm.

A drawback with using radar reflectivity to measure the rainfall rate is that the radar reflectivity at best creates an estimate of the actual rainfall. While radar reflectivity is generally understood to be directly related to the rainfall rate, a wide variety of atmospheric conditions are capable of leading to the same reflectivity, yet producing different rainfall rates. The differences in drop sizes specifically can lead to variations in the rainfall rate while producing the same reflectivity. For example, a small number of large drop sizes will produce the same reflectivity data as a large number of smaller rainfall drops, but a large number of smaller drop sizes will generally produce more precipitation on the ground than a small number of large drop sizes.

Many hydrologists attempt to solve the inaccuracies in measurements of rainfall rates with radar devices by employing calibration techniques to ensure that the radar measurements that are received are as accurate as possible. The persistent problem is that the actual error in the rainfall rates is not measured or computed. Even if estimates of rainfall rates can be produced with higher accuracy through calibration techniques, it is still important to be able to determine and present the full range of possible precipitation values. For example, if it is known that a river will flood if it receives over an inch of rain, then an estimate of 0.9 inches of rain may lead hydrologists to the false conclusion that the river will not flood. On the other hand, a probabilistic estimate that includes the possible range of precipitation values with corresponding likelihoods would allow a hydrologist to determine the probability that the river will flood.

Additionally, the amount of rainfall a crop has received is extremely important in modeling the growth of a crop. The amount of water a field receives not only affects the availability of water to the crop, but the availability of other elements, such as nitrogen and potassium, to the crop. As a crop's growth can be widely dependent on the availability of water and other chemicals, variances in the amount of rainfall received by a field can lead to variances in a model of the growth of a crop. If these variances are not understood and presented to a farmer, the farmer may not be able to make informed decisions with respect to the crop.

SUMMARY OF THE DISCLOSURE

The appended claims may serve as a summary of the disclosure.

DETAILED DESCRIPTION

Figure 1:
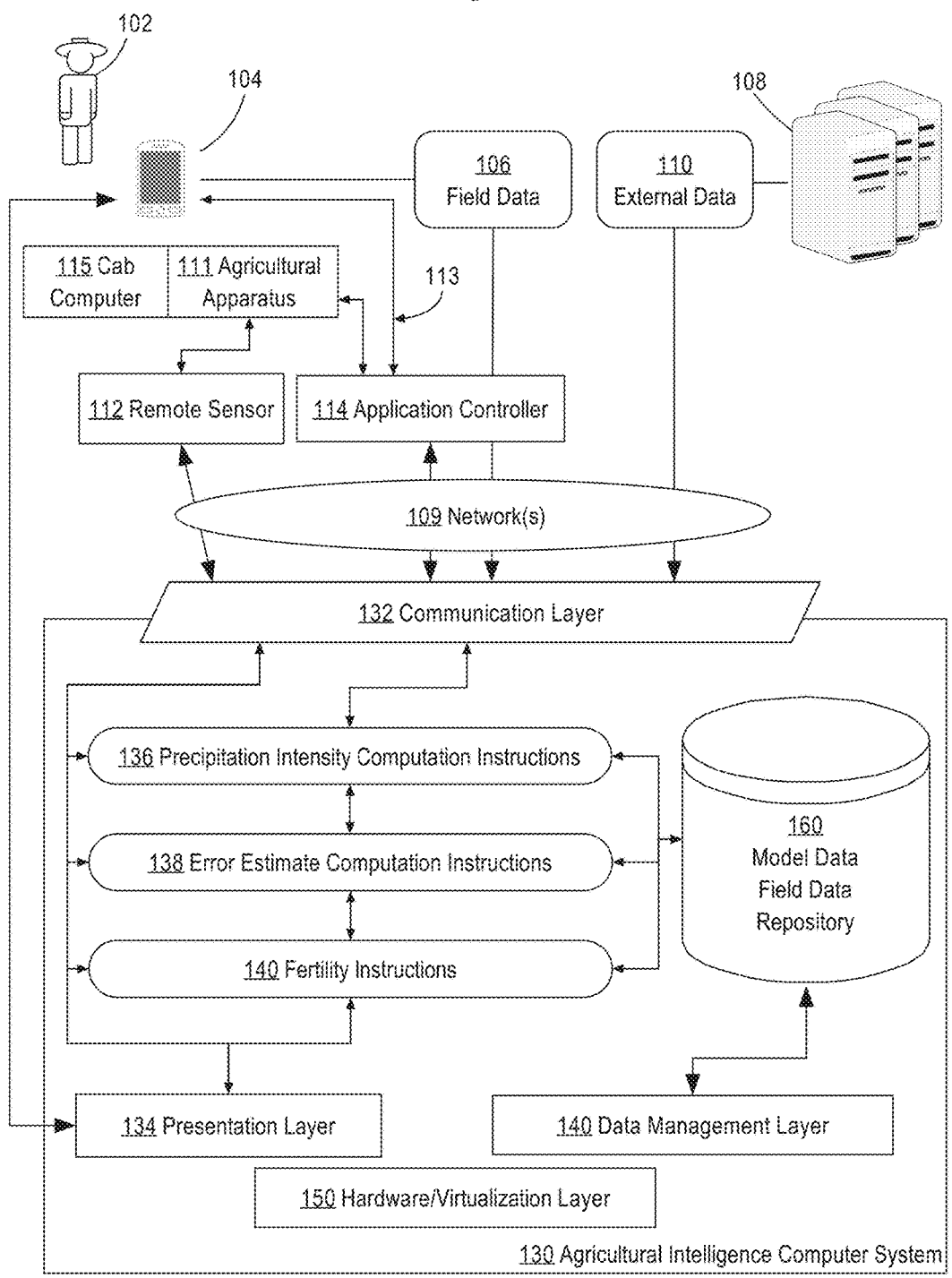
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1 STRUCTURAL OVERVIEW
   2.2. APPLICATION PROGRAM OVERVIEW
   2.3. DATA INGEST TO THE COMPUTER SYSTEM
   2.4 PROCESS OVERVIEW—AGRONOMIC MODEL TRAINING
   2.5 IMPLEMENTATION EXAMPLE—HARDWARE OVERVIEW
3. ERROR ESTIMATION
   3.1. RECEIVING GAUGE MEASUREMENT DATA
   3.2. OBTAINING RADAR BASED PRECIPITATION ESTIMATES
   3.3. MODELING UNCERTAINTY
   3.4. ADDITIONAL FACTORS
   3.5. GENERATING A PRECIPITATION ERROR TABLE
   3.6. DETERMINING A PARTICULAR PRECIPITATION ESTIMATE ERROR
4. ERROR ESTIMATE USAGE
   4.1. DISPLAYING PRECIPITATION ESTIMATES WITH ESTIMATED ERRORS
   4.2. IDENTIFYING THE RISK OF RARE EVENTS
   4.3. AGRONOMIC MODELS
5. BENEFITS OF CERTAIN EMBODIMENTS
6. EXTENSIONS AND ALTERNATIVES

1. GENERAL OVERVIEW

Aspects of the disclosure generally relate to computer-implemented techniques for identifying uncertainties in radar based precipitation estimates. In an embodiment, an agricultural intelligence computer system receives a plurality of gauge measurements at one or more gauge locations and obtains a plurality of radar based precipitation estimates at the one or more gauge locations. For each precipitation estimate, the agricultural intelligence computer system computes differences between the radar based precipitation estimates and the gauge measurements. Using the precipitation estimates and the computed differences, the agricultural intelligence computer system models a dependence of the uncertainty in the radar based precipitation estimates on the precipitation estimate values. When the agricultural intelligence computer system receives precipitation estimates for a location where gauge measurements are unavailable, the agricultural intelligence computer identifies an uncertainty for the precipitation estimate based on the value of the precipitation estimate and the model of the dependence of the uncertainty on the precipitation estimate values.

In an embodiment, a method comprises: using a communication layer of a digital weather computing system comprising one or more processors and digital memory, receiving over a network at the digital weather computing system, first electronic digital data comprising a first plurality of values representing precipitation gauge measurements at a plurality of gauge locations; using digitally programmed precipitation intensity instructions in the digital weather computing system, obtaining a plurality of radar based precipitation estimates at the plurality of gauge locations; using digitally programmed error estimate computation instructions in the digital weather computing system, for each radar based precipitation estimate, identifying one or more corresponding precipitation gauge measurement values of the first plurality of values representing precipitation gauge measurements, and computing a radar based precipitation estimate error for the radar based precipitation estimate based, at least in part, on one or more corresponding precipitation gauge measurement values of the first plurality of values representing precipitation gauge measurements and a radar based precipitation estimate value of the radar based precipitation estimate; using digitally programmed error estimate computation instructions in the digital weather computing system, computing a precipitation estimate value dependence of the radar based precipitation estimate errors and storing the precipitation estimate value dependence in a precipitation error data repository; using digitally programmed precipitation intensity instructions in the digital weather computing system, obtaining a particular radar based precipitation estimate at a non-gauge location; using digitally programmed error estimate computation instructions, determining a particular precipitation estimate error for the particular radar based precipitation estimate based, at least in part, on the precipitation estimate value dependence of the radar based precipitation estimate errors; using a presentation layer of the digital weather computing system, displaying the particular radar based precipitation estimate and the radar based precipitation estimate error for the particular radar based precipitation estimate.

Other features and aspect of the disclosure will become apparent in the drawings, description, and claims.

2. EXAMPLE AGRICULTURAL INTELLIGENCE COMPUTER SYSTEM 2.1 Structural Overview

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agricultural fields.

The field manager computing device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source), (f) pesticide data (for example, pesticide, herbicide, fungicide, other substance or mixture of substances intended for use as a plant regulator, defoliant, or desiccant), (g) irrigation data (for example, application date, amount, source), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An external data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of that might otherwise be obtained from third party sources, such as weather data.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is an example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user 102 may be prompted via one or more user interfaces on the user device (served by the agricultural intelligence computer system) to input such information. In an example embodiment, the user 102 may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user 102 may specify identification data by accessing field identification data (provided as shape files or in a similar format) from the U. S. Department of Agriculture Farm Service Agency or other source via the user device and providing such field identification data to the agricultural intelligence computer system.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Precipitation intensity computation instructions 136 comprise computer readable instructions which, when executed by one or more processors, causes agricultural intelligence computer system 130 to perform translation and computation of precipitation estimate values. Error estimate computation instructions 138 comprise computer readable instructions which, when executed by one or more processors, causes agricultural intelligence computer system 130 to perform translation and computation of uncertainty values corresponding to precipitation estimates. Fertility instructions 140 comprise computer readable instructions which, when executed by one or more processors, causes agricultural intelligence computer system 130 to create a digital agronomic model of one or more crops on one or more fields.

Figure 4:
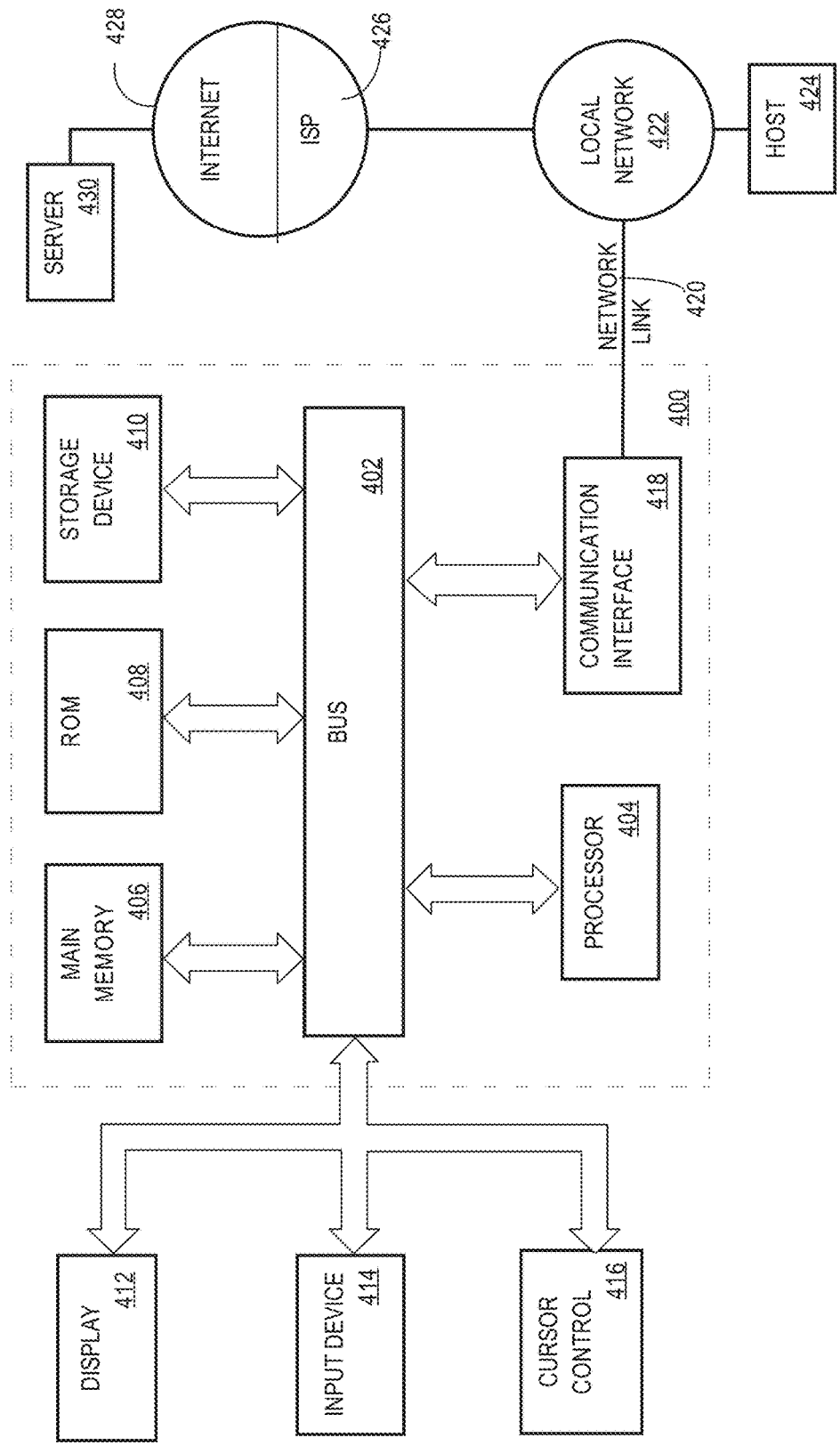
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system 130 independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide server-side functionality, via the network 109 to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
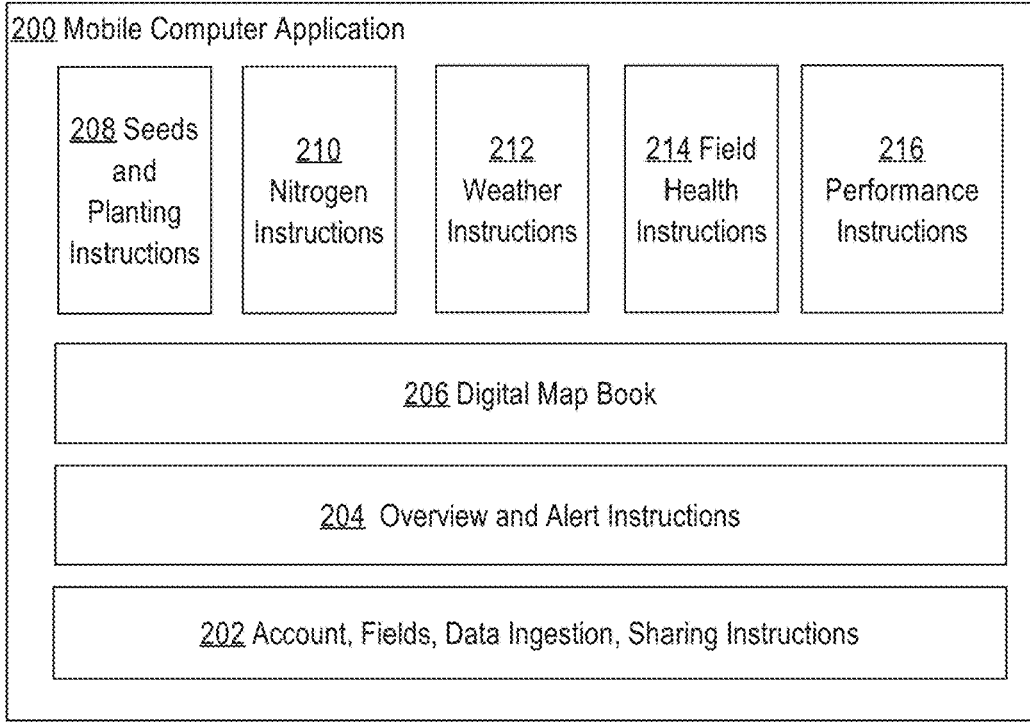
FIG. 2 illustrates two views of an example logical organization of sets of instructions in main memory when an example mobile application is loaded for execution.
Figure 2:
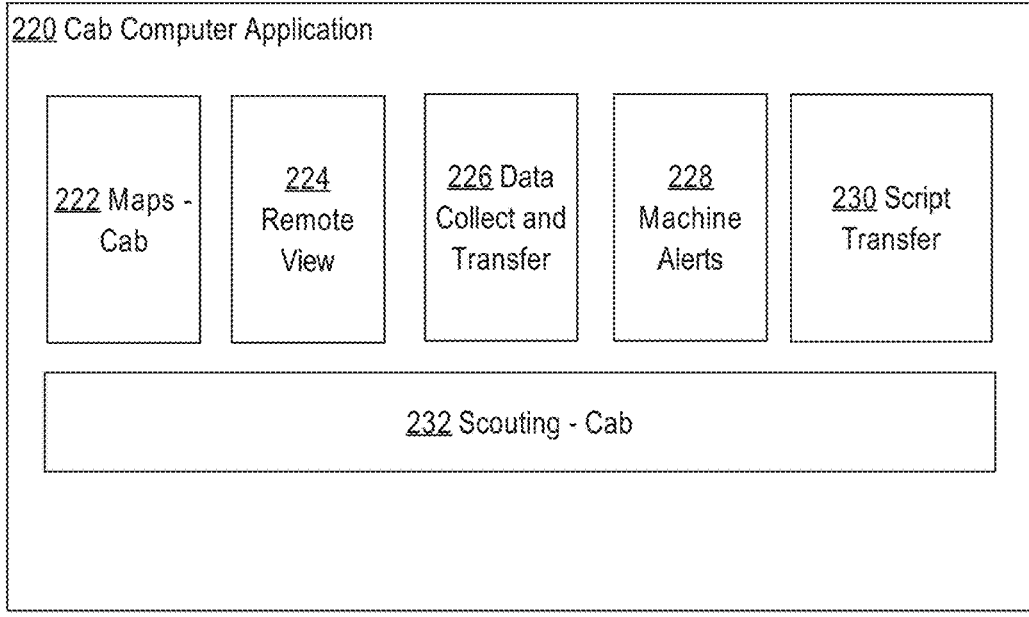

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, external APIs that push data to the mobile application, or instructions that call APIs of external systems to pull data into the mobile application.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 and programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, nitrogen instructions 210 are programmed to provide tools to inform nitrogen decisions by visualizing the availability of nitrogen to crops and to create variable rate (VR) fertility scripts. This enables growers to maximize yield or return on investment through optimized nitrogen application during the season. Example programmed functions include displaying images such as SSURGO images to enable drawing of application zones; upload of existing grower-defined zones; providing an application graph to enable tuning nitrogen applications across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of manure application that were used. Nitrogen instructions 210 also may be programmed to generate and cause displaying a nitrogen graph, once a program is applied to a field, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the NITROGEN ADVISOR, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-tip-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with UPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance; rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. No. 8,767,194 and U.S. Pat. No. 8,712,148 may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
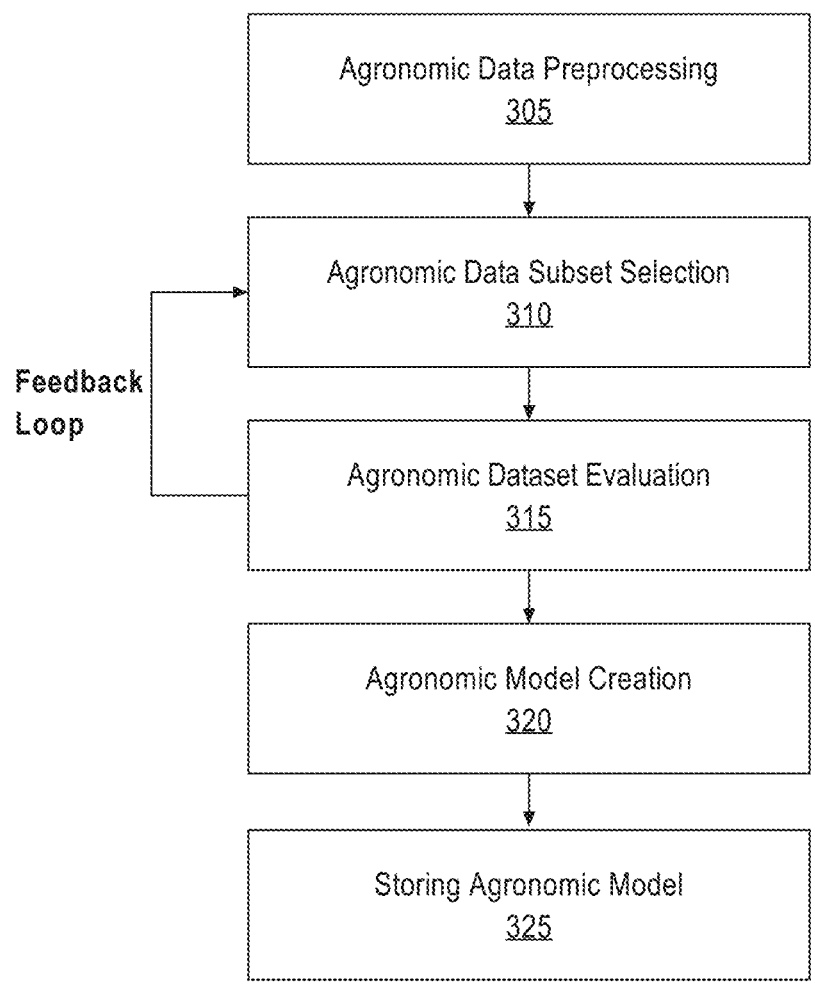
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more external data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more external data resources. The field data received from one or more external data resources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. ERROR ESTIMATION

3.1. Receiving Gauge Measurement Data

Figure 5:
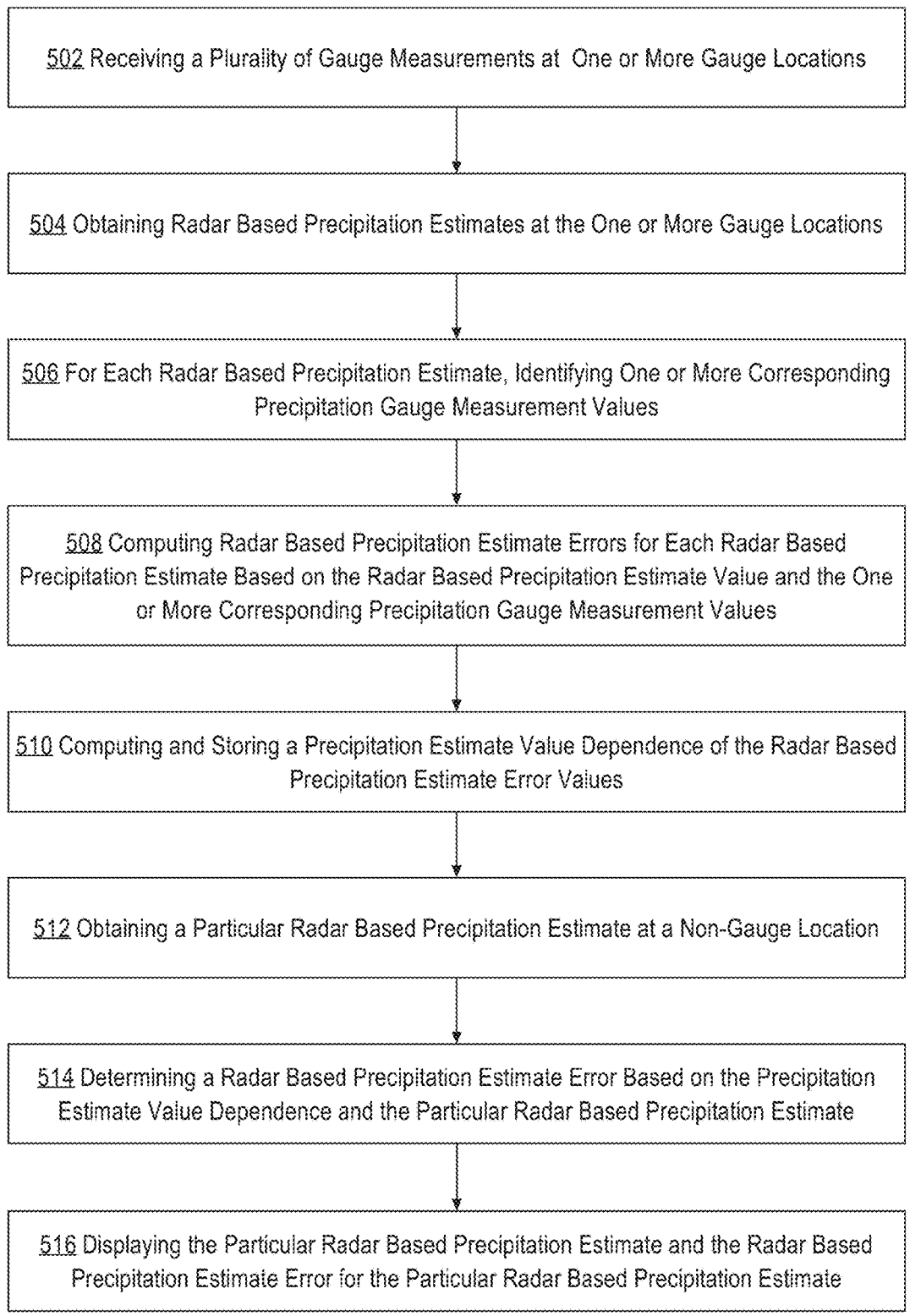
FIG. 5 is a flow diagram that depicts an example method for computing radar based precipitation estimates and radar based precipitation estimate errors at non-gauge locations based on gauge measurements at gauge locations and radar reflectivity data.

FIG. 5 is a flow diagram that depicts an example method for computing radar based precipitation estimates and radar based precipitation estimate errors at non-gauge locations based on gauge measurements at gauge locations and radar reflectivity data. A radar based precipitation error, as used herein, is a digitally stored data value representing an estimate of the uncertainty in one or more radar based precipitation estimates.

At step 502, a plurality of gauge measurements at one or more gauge locations are received. For example, agricultural intelligence computer system 130 may send a request to external data server computer 108 for a plurality of gauge measurements at the one or more gauge locations. External data server computer 108 may comprise one or more gauge server computers configured to transmit measurements of precipitation intensity as measured by one or more precipitation gauges.

The one or more gauge server computers may be communicatively coupled to one or more precipitation gauges at the one or more gauge locations. In the present context, a gauge location is location in which gauge measurements are received. For example, the Community Collaborative Rain, Hail, and Snow (CoCoRaHS) network maintains gauges at a plurality of locations. Each location from which CoCoRaHS receives measurements of precipitation may comprise a gauge location. Agricultural intelligence computer system 130 may send a request to the one or more gauge server computers for measurements of precipitation. In an embodiment, agricultural intelligence computer system 130 is programmed or configured to interact with multiple different computer servers to receive gauge measurements. For example, agricultural intelligence computer system 130 may receive gauge measurements from multiple different sources, thereby increasing the number of gauges which agricultural intelligence computer system 130 may use to identify errors in the radar measurements. Each gauge measurement source may comprise a single server computer or multiple server computers. For example, a computing device may be communicatively coupled to a gauge each location operated by a single source. The computing devices attached to the gauges may transmit the gauge measurements directly to agricultural intelligence computer system 130 or to a centralized server computer which transmits aggregated gauge data to agricultural intelligence computer system 130.

3.2. Obtaining Radar Based Precipitation Estimates

At step 504, radar based precipitation estimates are obtained. Agricultural intelligence computer system 130 may obtain the radar based precipitation estimates by initially receiving radar precipitation estimates from external data server computer 108. Additionally and/or alternatively, agricultural intelligence computer system 130 may initially receive radar reflectivity measurements from external data server computer 108 and compute the radar based precipitation estimates from the radar reflectivity measurements. In an embodiment, external data server computer 108 comprises a plurality of server computers owned or operated by different entities. For example, agricultural intelligence computer system 130 may be communicatively coupled to one or more radar server computers and one or more gauge server computers.

The one or more radar server computers may be communicatively coupled to a radar device which emits a polarized beam towards the one or more gauge locations and receives scattered energy. In some embodiments, agricultural intelligence computer system 130 receives reflectivity data, comprising a location of the radar device, an amount of energy emitted from the radar device, a direction of the energy emission, an amount of time between the emission and the receipt of the scattered energy, and an amount of scattered energy received. From the reflectivity data, agricultural intelligence computer system 130 may compute the location of the precipitation and the magnitude of the precipitation. In other embodiments, one or more initial computations may be performed in advance, such as by the one or more radar server computers, and agricultural intelligence computer system may receive location and/or precipitation magnitude estimates from the one or more radar server computers. For example, agricultural intelligence computer system 130 may send a request to the one or more radar server computers for radar measurements or precipitation estimates at a particular location, such as a gauge location. The one or more radar computer servers may compute the location of precipitation for each reflectivity measurement and may identify energy measurements that are associated with the particular location. The one or more radar computer servers may send the reflectivity measurements associated with the particular location to agricultural intelligence computer system 130. Additionally and/or alternatively, the one or more radar computer servers may compute one or more estimates for the amount of precipitation at the particular location and send the computed estimates to agricultural intelligence computer system 130.

Agricultural intelligence computer system 130 may be programmed or configured to receive radar data from multiple different sources. Agricultural intelligence computer system 130 may use the radar data received from different sources to strengthen the computation of precipitation intensities and the determination of the errors in the precipitation intensities. For example, agricultural intelligence computer system 130 may receive radar reflectivity measurements from multiple different radar devices at different locations. Agricultural intelligence computer system 130 may use the multiple measurements to correct for errors in the radar reflectivity measurements caused by outside sources, such as noise, atmospheric conditions, or physical barriers between radar devices and gauge locations. Additionally and/or alternatively, agricultural intelligence computer system 130 may model errors for precipitation estimates for each different radar device.

In an embodiment, agricultural intelligence computer system 130 parameterizes the Z-R transformation in order to compute the radar based precipitation estimates. Parameterizing the Z-R transformation may comprise identifying values for a and b in the Z-R transformation, $Z=aR^b$ that minimizes the difference between observed gauge measurements and estimations of the precipitation intensity calculated through the Z-R transformation. Agricultural intelligence computer system 130 may create a single parameterization of the Z-R transformation or create parameterizations of the Z-R transformation for particular periods of time, particular locations, or a combination of the two. For example, agricultural intelligence computer system 130 may parameterize the Z-R transformation for each twenty four hour period based on gauge measurements and reflectivity data received over the past twenty four hours. Additionally and/or alternatively, agricultural intelligence computer system 130 may parameterize the Z-R transformation separately for various locations. For example, agricultural intelligence computer system 130 may select a region that has been identified as encompassing a particular weather pattern and parameterize the Z-R transformation using gauge measurements and reflectivity data from gauges in the region identified as encompassing the particular weather pattern. Agricultural intelligence computer system 130 may also use combinations of temporal and geographical constraints in parameterizing the Z-R transformation. For example, agricultural intelligence computer system 130 may identify a particular weather pattern that encompasses a particular region during a particular period of time. Agricultural intelligence computer system 130 may parameterize the Z-R transformation using gauge measurements and reflectivity data from gauges in the particular region during the particular period of time.

Agricultural intelligence computer system 130 may also parameterize the Z-R transformation using other empirical data about the particular precipitation event. Agricultural intelligence computer system 130 may execute digitally programmed instructions to identify values for the parameters based on the other empirical data. For example, agricultural intelligence computer system 130 may receive disdrometer data identifying an average size of the drops of water in a particular storm. Based on the average drop size identified by the disdrometer, agricultural intelligence computer system 130 may select a stored set of parameters that corresponds to the particular drop size. Additional factors for identifying parameters in the Z-R transformation may include the drop size distribution and drop arrival rate.

3.3. Modeling Uncertainty

At step 506, one or more gauge corresponding precipitation gauge measurement values are identified for each radar based precipitation estimate. For example, for each precipitation estimate in a particular location, agricultural intelligence computer system 130 may identify gauge measurements in the particular location for the same period of time. While in some embodiments the gauge measurements are used to parameterize the Z-R transformation in order to create the precipitation estimates, the gauge measurements may still vary from the precipitation estimates because the parameterization of the Z-R transformation may reduce the magnitude of the errors, but may not fully eliminate the error.

At step 508 radar based precipitation errors for each radar based precipitation estimate are computed based on the radar based precipitation estimate value and the corresponding precipitation gauge measurement values. The gauge measurements may be treated as the true precipitation intensity in order to determine radar based precipitation errors of the radar based precipitation estimates. Computing radar based precipitation errors may comprise determining the difference between the gauge measurement values and the radar based precipitation estimate values. If multiple reflectivity measurements are used to compute the radar based precipitation estimate values, computing the radar based precipitation errors may also include computing errors for each radar based precipitation estimate produced from the multiple reflectivity measurements. For example, a single gauge measurement may correspond to several reflectivity measurements received by either a single radar device or multiple radar devices in multiple locations. Agricultural intelligence computer system 130 may identify a single precipitation estimate from the multiple measurements, but may generate precipitation estimate errors based on each reflectivity measurement.

At step 510, a precipitation estimate value dependence of the radar based precipitation estimate error values is computed and stored. For example, agricultural intelligence computer system 130 may compute an error for precipitation that is dependent on the precipitation estimate $\epsilon(R)$. Thus, a first value for the precipitation estimate may be associated with a different precipitation estimate error than a second value for the precipitation estimate.

In an embodiment, a computer-implemented programmed statistical model is used as the basis for the computation of the error. The error may be assumed to be normally distributed with a dependence on the precipitation estimate from the rain gauge. The error may also be assumed to be either multiplicative or additive. For example, the relationship between the rain gauge measurements and the radar estimates may take the form of a multiplicative error:

$$R_g = h(R_r)\epsilon_m(R_r) \text{ where } \epsilon_m(R_r) = N(1, \varphi + \alpha R_r^\beta)$$

or the form of an additive error:

$$R_g = h(R_r) + \epsilon_a(R_r) \text{ where } \epsilon_a(R_r) = N(0, \alpha R_r^\beta).$$

In the above equations, the systematic distortion, h, takes the form $h(R_r) = aR_r^b$. The normal distribution for either type of error is fit using the errors computed from the radar based precipitation estimates and the gauge measurements.

A statistical model may also be used which assumes an exponential component to the error and is based on a T distribution or a skewed T distribution. For example, a logarithmic form of the relation between the rain gauge measurements and the radar based precipitation estimates may take the form:

$$\ln R_g = a_0 + a_1 \ln R_r + \in \text{where } \in \sim T(0, e^{b_0 + b_1 R_r^b\ 2})$$

where $a_0$, $a_1$, $b_0$, $b_1$, and $b_2$ are parameterized from the differences between the rain gauge measurements and the radar based precipitation estimates.

A kernel density estimate may also be used to model the dependence of the radar based precipitation estimate errors on the radar based precipitation estimate values. For example, a kernel density estimate may take the form:

$$\hat{f}_h(x) = \frac{1}{n} \sum_{i=1}^{n} K_h(x - x_i)$$

where K is the kernel, a non-negative function that integrates to one, h is a smoothing parameter, and n is the size of the data set. In an embodiment, a normal function is used to fit the kernel density estimate to the data set. A cross validation selector may be utilized to select an optimal smoothing parameter for h based on the distribution type and the size of the data set.

3.4. Additional Factors

In an embodiment, agricultural intelligence computer system 130 models a dependence of the radar based precipitation estimate error on additional factors. Additional factors may include a distance from the radar device used to take the precipitation estimate and the corresponding gauge location, the time of year, the source of the reflectivity data or radar based precipitation estimates, and the elevation of the gauge location.

Modeling the dependence of the radar based precipitation estimate error on additional factors may either comprise adding a dependence term to the error equation. For example, a statistical model for the error term may include a dependence on distance:

$$\in \sim T_{skew}(0, e^{b_0 + b_1 R_r + b_2 D})$$

where D is the distance between the radar device and the gauge location and $b_2$ is parameterized based on differences between the estimated precipitation and the gauge data at different distances. For instance, radar reflectivity measurements at a particular gauge location may be taken from multiple radar devices in different locations. For each precipitation estimate value, a corresponding gauge measurement and a distance between the radar device and the gauge may be identified. Agricultural intelligence computer system 130 may then determine the dependence of the error on the distance of the radar device from the gauge. Additionally and/or alternatively, one or more radar devices may take radar reflectivity measurements at different gauge locations in order to identify a dependence of the error on the distance between the radar device and the gauge location. The same techniques may be applied for the time of year, such as a seasonal dependence, the source of radar based precipitation estimates, and the elevation of the location.

For factors that are not inherently numeric, such as the season or the source of a radar based precipitation estimate, values may be assigned for the dependence term of the factors. For example, a value $b_4$ may be added to the above exponent of the above equation in order to model a dependence of the error on the source of the radar based precipitation estimate or source of the reflectivity data. The value $b_4$ may be a particular value for each source, such as when estimates from a particular source are generally high or generally low, or may include a dependence on other terms. For example, a particular source may be less affected by the distance between the radar device and the gauge locations due to the quality of the radar devices used by the particular source. Thus, $b_4$ for the particular source may include a term that minimizes the dependence of the error on distance, such as $b_4 = c_0 - c_1 D$.

In an embodiment, modeling the dependence of the radar based precipitation error on additional factors may include using different models for various factors. For example, a first error estimate model may be created using gauge data and radar based precipitation estimates corresponding to the spring while a second error estimate model may be created using gauge data and radar based precipitation estimates corresponding to the winter season. Modeling the dependence of the radar based precipitation estimate error on additional factors for numerical values, such as distance or elevation, may comprise using different models for various ranges of factors. For example, a first error estimate model may be created for all precipitation estimates taken from radar devices that are between zero to fifty kilometers from the gauge location while a second error estimate model may be created for all precipitation estimates taken from radar devices that are between fifty and one hundred kilometers from the gauge location.

Agricultural intelligence computer system 130 may model the dependence of the radar based precipitation error on any combination of additional factors. For example, agricultural intelligence computer system 130 may create a different model for each season where each model contains a radar based precipitation estimate dependence term and a distance dependence term. As another example, agricultural intelligence computer system 130 may create a different model for each combination of a range of precipitation estimates and a season. A first model may relate to precipitation ranges of 0-10 mm during spring; a second model may relate to precipitation ranges of 10-25 mm during spring; and a third model may relate to precipitation ranges of 0-10 mm during winter.

3.5. Generating a Precipitation Error Table

In an embodiment, agricultural intelligence computer system 130 generates a precipitation error table for various precipitation estimates. A precipitation error table includes precipitation estimates with corresponding errors. The precipitation estimates may be either discrete estimates or ranges of precipitation estimates. Discrete estimates may include values separated by a particular interval. For example, different entries in the precipitation error table may be created for precipitation estimates of 1.1 mm, 1.2 mm, and 1.3 mm of rain. Ranges of precipitation estimates may include precipitation estimate value within a particular range which contain either similar forms of error or a similar range of probable precipitation. For example, an entry for precipitation estimates within the range of 1.1 mm-1.3 mm may be stored with corresponding errors.

Corresponding errors may be stored as either modifiers or ranges of probable precipitation. A modifier error may include an additive term and a subtractive term. For example, a precipitation estimate of 1.1 mm may correspond to a modifier error with an additive term of 0.2 and a subtractive term of 0.1. Thus, the range of probable precipitations based on the corresponding error for a precipitation estimate of 1.1 mm would include 1.0 mm-1.3 mm. A range of probabilities may include an associated range for each precipitation estimate. Thus, in the above example, the precipitation estimate of 1.1 mm may correspond to a range of 1.0 mm-1.3 mm. In an embodiment, modifiers are utilized as errors for ranges of precipitation estimates. For example, a range of precipitation estimates of 1.1 mm-1.3 mm may correspond to the modifier identified in the above example. Thus, a precipitation estimate of 1.1 mm would correspond to a range of probable precipitations of 1.0 mm-1.3 mm while a precipitation estimate of 1.2 mm would correspond to a range of probable precipitations of 1.1 mm-1.4 mm.

In an embodiment, agricultural intelligence computer system 130 generates the precipitation error table by sampling the models of the error for each precipitation value. For the statistical model, sampling the models of the error may include generating the statistical distribution for each precipitation estimate and sampling values from the statistical distribution to identify the precipitation errors or probable range of precipitation estimates for the precipitation estimate. For the kernel density estimator, the kernel function may be sampled for each precipitation estimate value to identify the probable errors.

In embodiments where agricultural intelligence computer server 130 models the errors based on additional factors, agricultural intelligence computer server 130 may create separate entries in the precipitation error table for each combination of factors. For example, if the precipitation error table is created based on models with a dependence on precipitation estimate and distance, each entry in the precipitation error table may comprise an identification of a precipitation estimate, a distance, and a corresponding error. Thus, a precipitation estimate of 1.1 mm at a distance of zero through fifty kilometers may be stored with a first corresponding error and a precipitation estimate of 1.1 mm at a distance of fifty through one hundred kilometers may be stored with a second corresponding estimate. Additionally and/or alternatively, an entry for a particular precipitation estimate may include a distance dependent term, such as an additional modifier which changes depending on the distance. For example, a precipitation estimate of 1.1 mm may include a distance dependence term which does not change the error if the distance is between zero and fifty kilometers and increases an upper bound of the range of probable precipitations by 0.1 mm if the distance is between fifty and one hundred kilometers.

3.6. Determining a Particular Precipitation Estimate Error

Using the model of the uncertainty in the precipitation estimates at gauge locations, agricultural intelligence computer system 130 may identify probable uncertainties for precipitation estimates at non-gauge locations. Agricultural intelligence computer system 130 may identify uncertainties for a particular precipitation estimate in response to a request for a precipitation estimate for one or more fields. Additionally and/or alternatively, agricultural intelligence computer system 130 may create precipitation estimates periodically for one or more locations and identify uncertainties for the periodically created precipitation estimates.

Referring to the method depicted in FIG. 5, at step 512 particular radar based precipitation estimates at a non-gauge location are obtained. For example, agricultural intelligence computer system 130 may send a request to external data server computer 108 for precipitation estimates for one or more particular locations. Additionally and/or alternatively, agricultural intelligence computer system 130 may send a request to external data server computer 108 for radar reflectivity data for one or more particular locations and may compute the particular radar based precipitation estimate from the radar reflectivity data.

At step 514, a radar based precipitation estimate error is determined based on the precipitation estimate value dependence and the particular radar based precipitation estimate. In an embodiment, agricultural intelligence computer system 130 determines the radar based precipitation estimate error for the particular precipitation estimate by calculating the error using one of the modeling techniques identified above. For example, the precipitation estimate value may be input into one or more of the above equations. The distribution of the error created with the precipitation estimate value may then be used as the error for the particular radar based precipitation estimate. When additional factors are used to model the precipitation error, additional data associated with the precipitation estimate value, such as time of year, elevation of non-gauge location, and/or distance from the radar to the non-gauge location may be input into one or more of the above equations with additional dependence terms.

Additionally and/or alternatively, agricultural intelligence computer system 130 may identify the particular radar based precipitation estimate error for the particular radar based precipitation estimate value in the precipitation error table. Agricultural intelligence computer system 130 may identify the error by searching through the precipitation error table for an entry that matches the particular radar based precipitation estimate. Thus, if the particular radar based precipitation estimate value is 1.1 mm of rain, agricultural intelligence computer system 130 may identify the error by searching the precipitation error table for the error that corresponds to the precipitation value of 1.1 mm.

When additional factors are used to create the precipitation error table, agricultural intelligence computer system 130 may search the precipitation error table for an entry that matches both the particular precipitation estimate value and the additional factors. For example, agricultural intelligence computer system 130 may receive a precipitation estimate value of 1.1 mm at a particular location and data indicating that the radar device used to take the radar reflectivity measurements is seventy kilometers from the particular location. In response, agricultural intelligence computer system 130 may identify an entry in the precipitation error table for a precipitation error that corresponds to a precipitation estimate value of 1.1 mm with a distance range of fifty kilometers to one hundred kilometers.

4. ERROR ESTIMATE USAGE 4.1. Displaying Precipitation Estimates with Estimated Errors At step 516, the particular radar based precipitation estimate and radar based precipitation estimate error is displayed. Displaying the particular radar based precipitation estimate and radar based precipitation estimate error may comprise displaying a range of probable precipitations with an indication of the estimated value. Agricultural intelligence computer system 130 may display the particular radar based precipitation estimate and radar based precipitation estimate error through presentation layer 134 on field manager computing device 104.

Figure 6:
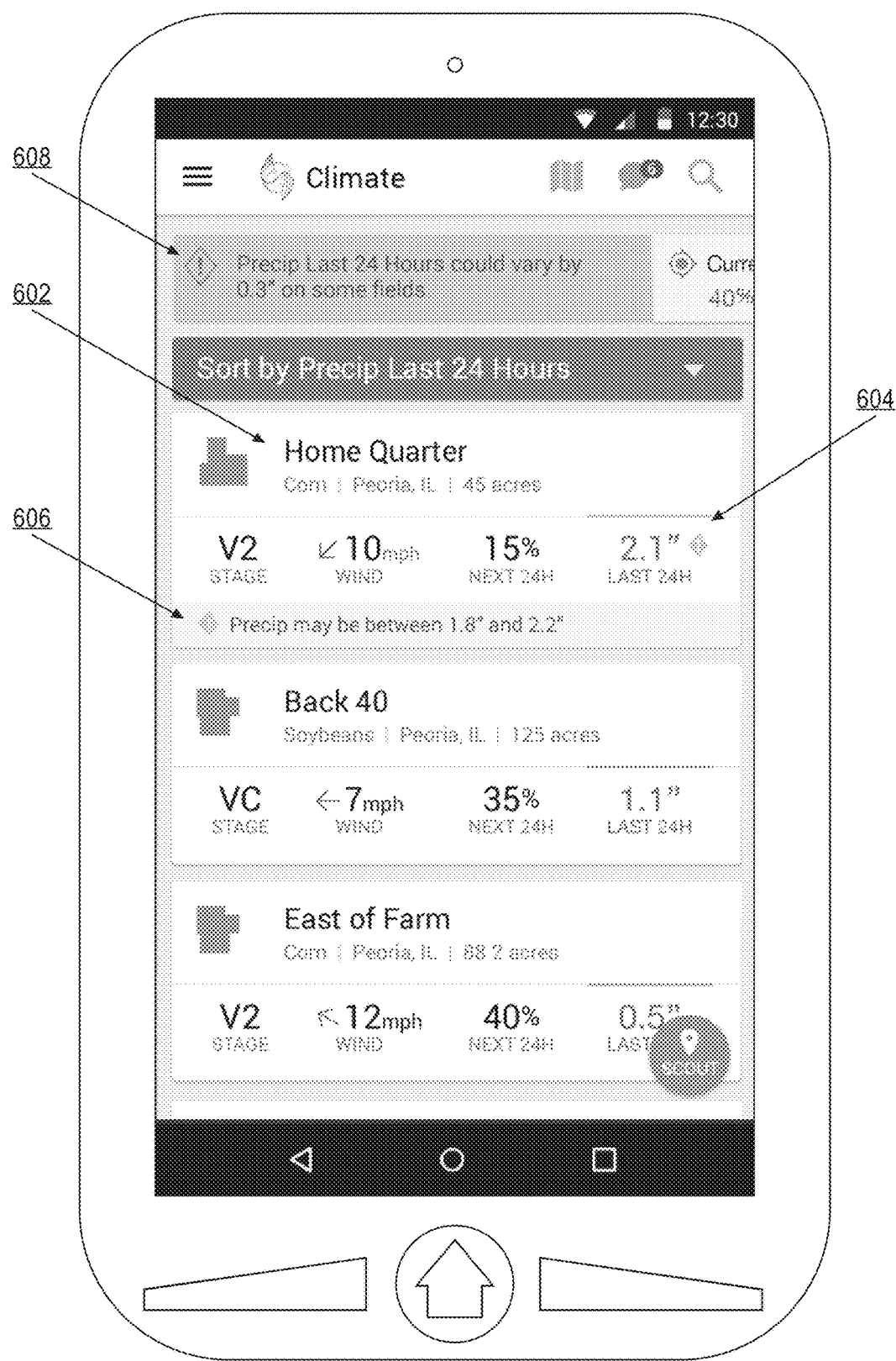
FIG. 6 depicts a graphical user interface displaying precipitation estimates with possible errors for one or more fields on a client computing device.

FIG. 6 depicts a graphical user interface displaying precipitation estimates with possible errors for one or more fields on a client computing device. Field manager computing device 104 contains a graphical user interface with field identification 602, precipitation estimate 604, precipitation uncertainty 606, and uncertainty warning 608. Field identification 602 identifies one or more fields associated with user 102 of field manager computing device 104. For example, user 102 may be a farmer that wishes to track an amount of water received by one or more crops on one or more fields. The farmer may identify the one or more fields to agricultural intelligence computer system 130 and agricultural intelligence computer system 130 may send precipitation estimates at the one or more fields to the farmer.

Precipitation estimate 604 identifies the estimated precipitation value for a particular period of time. Precipitation estimate 604 may correspond to a precipitation estimate received by agricultural intelligence computer system 130 or computed by agricultural intelligence computer system 130 from radar reflectivity data relating to the one or more fields. Precipitation uncertainty 606 depicts the radar based precipitation estimate error. For example, in FIG. 6, the precipitation estimate is 2.1" and the estimate error includes a range from 1.8" to 2.2". Uncertainty warning 608 identifies a variance of precipitation for one or more of the fields. By indicating a variance that applies to one or more of the fields, agricultural intelligence computer system 130 notifies user 102 that the precipitation estimates may not be completely accurate, thereby allowing user 102 to make more informed decisions regarding management of the crops on the one or more fields.

4.2. Identifying the Risk of Rare Events

In an embodiment, agricultural intelligence computer system 130 uses the uncertainty in the precipitation estimates to identify the risk of a rare event occurring. Agricultural intelligence computer system 130 may receive a request to monitor one or more locations for occurrence of a rare event or to identify the probability that a rare event occurred where occurrence of the rare event is conditional, at least in part, on a particular intensity of precipitation. For example, agricultural intelligence computer system 130 may receive a request to monitor a particular river to determine if the river will flood. Agricultural intelligence computer system 130 may also receive data indicating that the river will flood if it receives over three inches of precipitation. To identify the risk of the rare event occurring, agricultural intelligence computer system 130 may identify a probability that the particular intensity of precipitation occurred.

Figure 7:
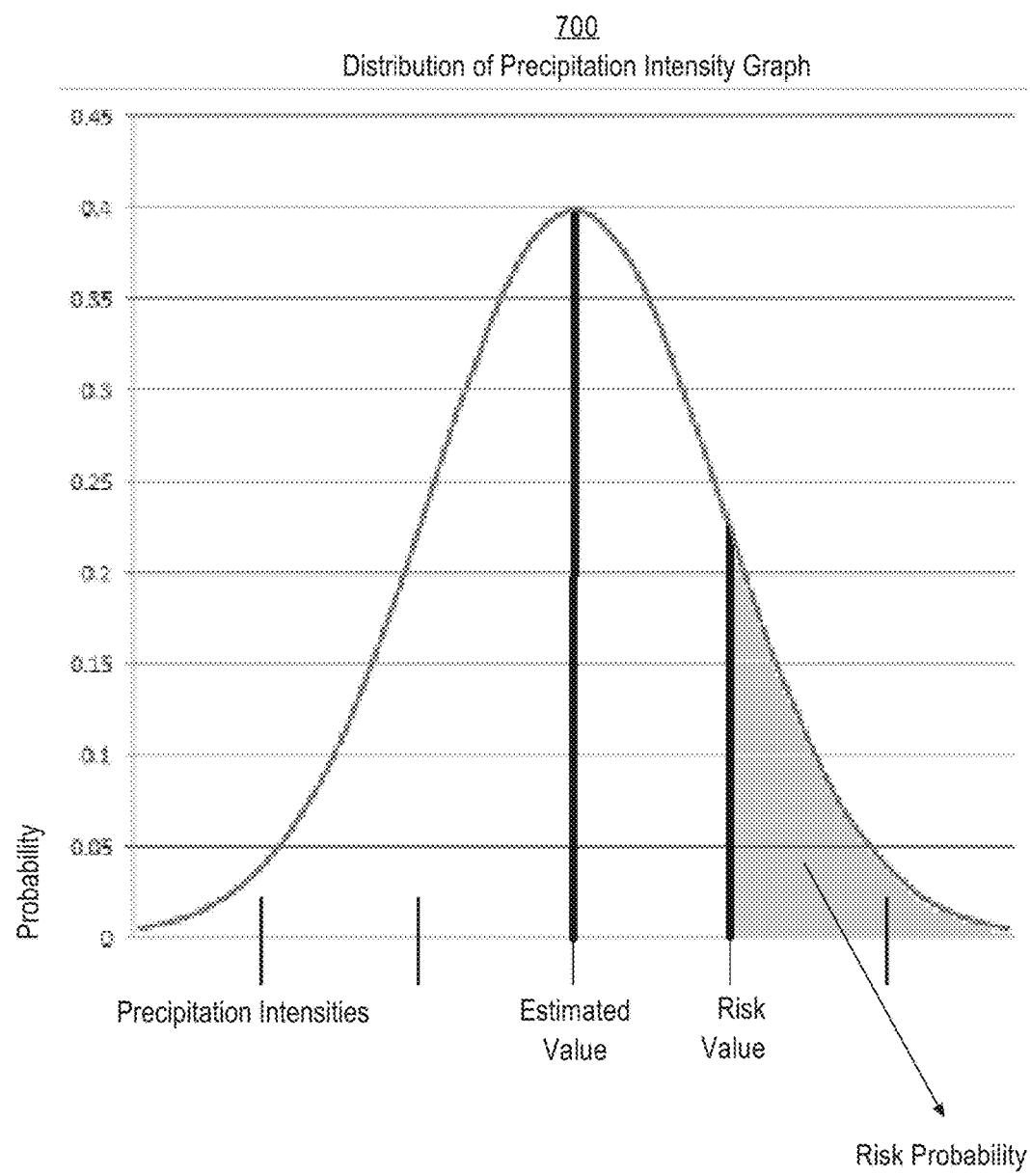
FIG. 7 depicts a method of identifying a risk of a rare event using a probabilistic estimate of precipitation intensity.

FIG. 7 depicts a method of identifying a risk of a rare event using a probabilistic estimate of precipitation intensity. In an embodiment, agricultural intelligence computer system 130 generates distribution of precipitation intensity graph 700 from the precipitation estimate and the uncertainty in the precipitation estimate. For example, agricultural intelligence computer system 130 may use either a statistical model or a kernel density estimate to generate a probability distribution describing the precipitation estimate for a particular period of time. Distribution of precipitation intensity graph 700 contains an estimated value at the peak of the distribution and a risk value indicating the particular intensity of precipitation upon which the occurrence of the rare event is conditional. Agricultural intelligence computer system 130 may identify the risk of occurrence of the rare event by computing the area under the curve depicted in distribution of precipitation intensity graph 700 above the risk value. As an example, if the estimated value of precipitation is 2.1" and the risk value is 2.4", an initial estimate of the precipitation intensity may lead to the false assumption that the rare event would not occur. Under the method depicted in FIG. 7, agricultural intelligence computer system 130 may determine that, while the estimate value of precipitation is 2.1", there is a 30% probability that the actual precipitation is 2.4" or above. Thus, agricultural intelligence computer system 130 may identify a 30% probability of the rare event occurring.

4.3. Agronomic Models

In an embodiment, agricultural intelligence computer system 130 uses precipitation estimates and uncertainties in the precipitation estimates to create an agronomic model. In an embodiment, an agronomic model is a data structure in memory of agricultural intelligence computer system 130 that contains location and crop information for one or more fields. An agronomic model may also contain agronomic factors which describe conditions which may affect the growth of one or more crops on a field. Additionally, an agronomic model may contain recommendations based on agronomic factors such as crop recommendations, watering recommendations, planting recommendations, and harvesting recommendations. The agronomic factors may also be used to estimate one or more crop related results, such as agronomic yield. The agronomic yield of a crop is an estimate of quantity of the crop that is produced.

In an embodiment, agricultural intelligence computer system 130 uses the precipitation estimates to create an agronomic model in memory or in persistent storage in response to a request from field manager computing device 104 for an agronomic model. In other embodiments, agricultural intelligence computer system 130 receives a request from a third party for an agronomic model. For example, an insurance company may request an agronomic model for an insured customer's field to determine the risks associated with the crop planted by the customer. In another example, an application server may send a request to agricultural intelligence computer system 130 to create an agronomic model for a specific user's field. Alternatively, agricultural intelligence computer system 130 may generate agronomic models periodically for particular supervised fields. Agricultural intelligence computer system 130 may also generate agronomic models in response to obtaining updated precipitation estimates.

Agricultural intelligence computer system 130 may create an agronomic model which identifies one or more affects of received precipitation on the crops of a field. The amount of water a crop receives may affect the development cycle of the crop. Agricultural intelligence computer system 130 may estimate the amount of water a crop needs and determine the likely amount of water the crop will receive from natural precipitation based on the precipitation estimates. Agricultural intelligence computer system 130 may use this information to affect the estimate for agronomic yield. Additionally, agricultural intelligence computer system 130 may use the precipitation estimates to generate recommendations for farmers. For example, agricultural intelligence computer system 130 may recommend that a crop is not watered on a day that has a high probability of large amounts of precipitation. Alternatively, agricultural intelligence computer system 130 may recommend that a crop receives extra water for periods of time when precipitation has been estimated to be low.

In an embodiment, uncertainties in the estimates are propagated into the agronomic models. For example, agricultural intelligence computer system 130 may determine that a particular crop requires 2.1" of precipitation on a particular day before the crop is adversely affected by the lack of water. If agricultural intelligence computer system 130 obtains an estimate of 2.2" of precipitation on the particular day, agricultural intelligence computer system 130 may identify the probability that the actual precipitation is lower than 2.1" and create a probability that the crop is adversely affected by the lack of water based on the probability that the actual precipitation is lower than 2.1". In an embodiment, agricultural intelligence computer system 130 identifies overall affects on agronomic values based on uncertainties in the precipitation. For example, agricultural intelligence computer system 130 may identify a different agronomic yield for a crop when the crop receives less than 2.1" of precipitation. Thus, using the techniques described herein, agricultural intelligence computer system 130 may generate a probabilistic distribution of the agronomic yield of the crop based, at least in part, on uncertainties in the precipitation received by the crop.

Uncertainties in the estimates of precipitation estimates may also be propagated into other models that have a dependence on water content in the one or more fields. For example, the moisture content of a field may affect a crop's ability to access one or more agrochemicals, such as nitrogen, in the field. Additionally, the moisture content of a field may affect the loss of agrochemicals through processes such as leaching. Thus, while the precipitation estimates may be used to model the effects of precipitation on the other models, agricultural intelligence computer system 130 may also model the effects on the other models of different levels of precipitation that are consistent with the estimated uncertainties. For example, if precipitation above a particular level would increase the loss of nitrogen by ten percent, agricultural intelligence computer system 130 may identify the probability that the actual precipitation intensity is above the particular level as a probability of an increase in the loss of nitrogen by ten percent.

5. BENEFITS OF CERTAIN EMBODIMENTS

Using the techniques described herein, a computer can deliver precipitation uncertainty data that would be otherwise unavailable. For example, the techniques herein can determine, for a particular radar based precipitation estimate, a range of precipitation values that encompasses the actual amount of precipitation received by one or more fields. The performance of the agricultural intelligence computing system is improved using the precipitation error table techniques described herein which identifies precipitation uncertainty with high computational efficiency, thereby reducing the amount of memory used to determine the uncertainties with each precipitation estimate. Additionally, the techniques described herein may be used to create recommendations and alerts for farmers, insurance companies, and hydrologists, thereby allowing for a more effective response to particular weather conditions.

6. EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   using a communication layer of a digital weather computing system comprising one or more processors and digital memory, receiving over a network at the digital weather computing system, first electronic digital data comprising a first plurality of values representing precipitation gauge measurements at a plurality of gauge locations;
   using digitally programmed precipitation intensity instructions in the digital weather computing system, obtaining a plurality of radar based precipitation estimates at the plurality of gauge locations;
   using digitally programmed error estimate computation instructions in the digital weather computing system, for each radar based precipitation estimate, identifying one or more corresponding precipitation gauge measurement values of the first plurality of values representing precipitation gauge measurements, and computing a radar based precipitation estimate error for the radar based precipitation estimate based, at least in part, on one or more corresponding precipitation gauge measurement values of the first plurality of values representing precipitation gauge measurements and a radar based precipitation estimate value of the radar based precipitation estimate;
   using digitally programmed error estimate computation instructions in the digital weather computing system, computing a precipitation estimate value dependence of the radar based precipitation estimate errors and storing the precipitation estimate value dependence in a precipitation error data repository;
   using digitally programmed precipitation intensity instructions in the digital weather computing system, obtaining a particular radar based precipitation estimate at a non-gauge location;
   using digitally programmed error estimate computation instructions, determining a particular precipitation estimate error for the particular radar based precipitation estimate based, at least in part, on the precipitation estimate value dependence of the radar based precipitation estimate errors;
   using a presentation layer of the digital weather computing system, displaying the particular radar based precipitation estimate and the radar based precipitation estimate error for the particular radar based precipitation estimate.

2. The method of claim 1, further comprising:
   using digitally programmed error estimate computation instructions in the digital weather computing system, for each of a plurality of ranges of radar based precipitation estimates, computing a precipitation estimate error based, at least in part, on the range of radar based precipitation estimates and the precipitation estimate value dependence of the radar based precipitation estimate errors;
   using digitally programmed error estimate computation instructions in the digital weather computing system, generating a precipitation error table in memory comprising the plurality of ranges of radar based precipitation estimates, and a plurality of corresponding precipitation estimate errors mapped to the plurality of ranges of radar based precipitation estimates;
   wherein using digitally programmed error estimate computation instructions, determining a particular precipitation estimate error for the particular radar based precipitation estimate comprises:
     identifying, in the precipitation error table, a particular range of radar based precipitation estimates that includes the particular radar based precipitation estimate;
     identifying, in the precipitation error table, the particular precipitation estimate error mapped to the particular range of radar based precipitation estimates.

3. The method of claim 1, further comprising:
using the digitally programmed error estimate computation instructions of the digital weather computing system, performing, for each radar based precipitation estimate:
identifying a gauge location of the plurality of gauge locations;
computing a distance value representing a distance between the gauge location and a corresponding radar device used to take one or more particular radar reflectivity measurements at the gauge location;
wherein the one or more particular radar reflectivity measurements correspond to the radar based precipitation estimate;
using the digitally programmed error estimate computation instructions in the digital weather computing system, computing and storing a distance dependence of the radar based precipitation estimate error based, at least in part, on the computed distance values, the plurality of radar based precipitation estimates, and the first plurality of values representing precipitation gauge measurements;
wherein using the digitally programmed error estimate computation instructions, determining a particular precipitation estimate error for the particular radar based precipitation estimate is further based on the distance dependence of the radar based precipitation estimate error.

4. The method of claim 1, further comprising:
using the digitally programmed error estimate computation instructions of the digital weather computing system, performing, for each radar based precipitation estimate:
identifying a date of a particular radar reflectivity measurement and a corresponding precipitation gauge measurement associated with the radar based precipitation estimate;
assigning a seasonal value to the radar based precipitation estimate based on the identified date;
using the digitally programmed error estimate computation instructions in the digital weather computing system, computing and storing a seasonal dependence of the radar based precipitation estimate error based, at least in part, on the assigned seasonal values, the plurality of radar based precipitation estimates, and the first plurality of values representing precipitation gauge measurements;
wherein using the digitally programmed error estimate computation instructions, determining a particular precipitation estimate error for the particular radar based precipitation estimate is further based on the seasonal dependence of the radar based precipitation estimate error.

5. The method of claim 1, wherein using the digitally programmed error estimate computation instructions in the digital weather computing system, computing the precipitation estimate value dependence of the radar based precipitation estimate errors comprises fitting a kernel density estimate to the radar based precipitation estimate errors for the plurality of radar based precipitation estimates.

6. The method of claim 1, further comprising:
using the communication layer of the digital weather computing system, receiving, over a network at the digital weather computing system, risk data indicating occurrence of an event that is conditional, at least in part, on occurrence of a particular precipitation intensity;
using digitally programmed precipitation intensity computation instructions of the digital weather computing system, identifying, from the particular radar based precipitation estimate and the radar based precipitation estimate error for the particular radar based precipitation estimate, a probability of the occurrence of the particular precipitation intensity;
using digitally programmed precipitation intensity computation instructions of the digital weather computing system, based on the probability of the occurrence of the particular precipitation intensity, identifying a probability of occurrence of the event.

7. The method of claim 6, further comprising using the presentation layer of the digital weather computing system, sending from the digital weather computing system, to one or more computing devices, notification data identifying the event and the probability of occurrence of the event.

8. The method of claim 1, further comprising:
using the communication layer of the digital weather computing system, receiving, from a client computing device, electronic digital data comprising a plurality of location values representing geographic locations for one or more fields;
wherein the plurality of location values representing geographic locations for the one or more fields includes a particular location value for the non-gauge location;
using the presentation layer of the digital weather computing system, causing displaying, on the client computing device, a graphical user interface which includes an identification of the non-gauge location, the particular radar based precipitation estimate, and the radar based precipitation estimate error for the particular radar based precipitation estimate.

9. The method of claim 1, further comprising:
using the communication layer of the digital weather computing system, receiving, from a client computing device, electronic digital data comprising a plurality of location values representing geographic locations of one or more fields and a plurality of crop values representing crop information for one or more crops on the one or more fields;
wherein the plurality of location values representing geographic locations for the one or more fields includes a particular location value for the non-gauge location;
using digitally programmed fertility instructions of the digital weather computing system, modeling a plurality of precipitation effects on the one or more crops and a probability of each of the plurality of precipitation effects on the one or more crops based, at least in part, on the particular radar based precipitation estimate and the radar based precipitation estimate error for the particular radar based precipitation estimate;
using the presentation layer of the digital weather computing system, causing displaying, on the client computing device, a graphical user interface which includes an identification of the non-gauge location, an identification of the one or more crops, the plurality of precipitation effects on the one or more crops, and the probability of each of the plurality of precipitation effects on the one or more crops.

10. The method of claim 9, wherein using digitally programmed fertility instructions of the digital weather computing system, modeling the plurality of precipitation effects on the one or more crops and the probability of each of the plurality of precipitation effects on the one or more crops based, at least in part, on the particular radar based precipitation estimate and the radar based precipitation estimate error for the particular radar based precipitation estimate comprises:
  generating a crop model that models growth of the one or more crops based, at least in part, on water and nutrient availability to the one or more crops;
  creating, from the particular radar based precipitation estimate and the radar based precipitation estimate error for the particular radar based precipitation estimate, a range of precipitation intensities with corresponding probabilities for the non-gauge location;
  using the radar based precipitation estimate as a precipitation input for the crop model and the range of precipitation intensities with corresponding probabilities as a variance input for the crop model.

11. A data processing system comprising:
  a memory;
  one or more processors coupled to the memory and configured to:
  receive over a network first electronic digital data comprising a first plurality of values representing precipitation gauge measurements at a plurality of gauge locations;
  obtain a plurality of radar based precipitation estimates at the plurality of gauge locations;
  for each radar based precipitation estimate, identify one or more corresponding precipitation gauge measurement values of the first plurality of values representing precipitation gauge measurements, and compute a radar based precipitation estimate error for the radar based precipitation estimate based, at least in part, on one or more corresponding precipitation gauge measurement values of the first plurality of values representing precipitation gauge measurements and a radar based precipitation estimate value of the radar based precipitation estimate;
  compute a precipitation estimate value dependence of the radar based precipitation estimate errors and storing the precipitation estimate value dependence in a precipitation error data repository;
  obtain a particular radar based precipitation estimate at a non-gauge location;
  determine a particular precipitation estimate error for the particular radar based precipitation estimate based, at least in part, on the precipitation estimate value dependence of the radar based precipitation estimate errors;
  display the particular radar based precipitation estimate and the radar based precipitation estimate error for the particular radar based precipitation estimate.

12. The data processing system of claim 11, wherein the one or more processors are further configured to:
  for each of a plurality of ranges of radar based precipitation estimates, compute a precipitation estimate error based, at least in part, on the range of radar based precipitation estimates and the precipitation estimate value dependence of the radar based precipitation estimate errors;
  generate a precipitation error table in memory comprising the plurality of ranges of radar based precipitation estimates, and a plurality of corresponding precipitation estimate errors mapped to the plurality of ranges of radar based precipitation estimates;
  wherein the one or more processors are configured to determine a particular precipitation estimate error for the particular radar based precipitation estimate by:
    identifying, in the precipitation error table, a particular range of radar based precipitation estimates that includes the particular radar based precipitation estimate;
    identifying, in the precipitation error table, the particular precipitation estimate error mapped to the particular range of radar based precipitation estimates.

13. The data processing system of claim 11, wherein the one or more processors are further configured to:
  for each radar based precipitation estimate:
    identify a gauge location of the plurality of gauge locations;
    compute a distance value representing a distance between the gauge location and a corresponding radar device used to take one or more particular radar reflectivity measurements at the gauge location;
    wherein the one or more particular radar reflectivity measurements correspond to the radar based precipitation estimate;
  compute and store a distance dependence of the radar based precipitation estimate error based, at least in part, on the computed distance values, the plurality of radar based precipitation estimates, and the first plurality of values representing precipitation gauge measurements;
  wherein the one or more processors are further configured to determine a particular precipitation estimate error for the particular radar based precipitation estimate based on the distance dependence of the radar based precipitation estimate error.

14. The data processing system of claim 11, wherein the one or more processors are further configured to:
  for each radar based precipitation estimate:
    identify a date of a particular radar reflectivity measurement and a corresponding precipitation gauge measurement associated with the radar based precipitation estimate;
    assign a seasonal value to the radar based precipitation estimate based on the identified date;
  compute and store a seasonal dependence of the radar based precipitation estimate error based, at least in part, on the assigned seasonal values, the plurality of radar based precipitation estimates, and the first plurality of values representing precipitation gauge measurements;
  wherein the one or more processors are further configured to determine a particular precipitation estimate error for the particular radar based precipitation estimate based on the seasonal dependence of the radar based precipitation estimate error.

15. The data processing system of claim 11, wherein the one or more processors are further configured to compute the precipitation estimate value dependence of the radar based precipitation estimate errors by fitting a kernel density estimate to the radar based precipitation estimate errors for the plurality of radar based precipitation estimates.

16. The data processing system of claim 11, wherein the one or more processors are further configured to:
  receive, over a network, risk data indicating occurrence of an event that is conditional, at least in part, on occurrence of a particular precipitation intensity;
  identify, from the particular radar based precipitation estimate and the radar based precipitation estimate error for the particular radar based precipitation estimate, a probability of the occurrence of the particular precipitation intensity;
  based on the probability of the occurrence of the particular precipitation intensity, identify a probability of occurrence of the event.

17. The data processing system of claim 16, wherein the one or more processors are further configured to send to one or more computing devices notification data identifying the event and the probability of occurrence of the event.

18. The data processing system of claim 11, wherein the one or more processors are further configured to:
receive, from a client computing device, electronic digital data comprising a plurality of location values representing geographic locations for one or more fields;
wherein the plurality of location values representing geographic locations for the one or more fields includes a particular location value for the non-gauge location;
cause displaying, on the client computing device, a graphical user interface which includes an identification of the non-gauge location, the particular radar based precipitation estimate, and the radar based precipitation estimate error for the particular radar based precipitation estimate.

19. The data processing system of claim 11, further comprising:
receive, from a client computing device, electronic digital data comprising a plurality of location values representing geographic locations of one or more fields and a plurality of crop values representing crop information for one or more crops on the one or more fields;
wherein the plurality of location values representing geographic locations for the one or more fields includes a particular location value for the non-gauge location;
model a plurality of precipitation effects on the one or more crops and a probability of each of the plurality of precipitation effects on the one or more crops based, at least in part, on the particular radar based precipitation estimate and the radar based precipitation estimate error for the particular radar based precipitation estimate;
cause displaying, on the client computing device, a graphical user interface which includes an identification of the non-gauge location, an identification of the one or more crops, the plurality of precipitation effects on the one or more crops, and the probability of each of the plurality of precipitation effects on the one or more crops.

20. The data processing system of claim 19, wherein the one or more processors are further configured to model the plurality of precipitation effects on the one or more crops and the probability of each of the plurality of precipitation effects on the one or more crops based, at least in part, on the particular radar based precipitation estimate and the radar based precipitation estimate error for the particular radar based precipitation estimate by:
generating a crop model that models growth of the one or more crops based, at least in part, on water and nutrient availability to the one or more crops;
creating, from the particular radar based precipitation estimate and the radar based precipitation estimate error for the particular radar based precipitation estimate, a range of precipitation intensities with corresponding probabilities for the non-gauge location;
using the radar based precipitation estimate as a precipitation input for the crop model and the range of precipitation intensities with corresponding probabilities as a variance input for the crop model.

21. A method comprising:
receiving over a network at a digital weather computing system comprising one or more processors and digital memory, first electronic digital data comprising a first plurality of values representing precipitation gauge measurements at a plurality of gauge locations;
using the digital weather computing system, obtaining a plurality of radar based precipitation estimates at the plurality of gauge locations;
using the digital weather computing system, for each radar based precipitation estimate, identifying one or more corresponding precipitation gauge measurement values of the first plurality of values representing precipitation gauge measurements, and computing a radar based precipitation estimate error for the radar based precipitation estimate based, at least in part, on one or more corresponding precipitation gauge measurement values of the first plurality of values representing precipitation gauge measurements and a radar based precipitation estimate value of the radar based precipitation estimate;
using the digital weather computing system, computing a precipitation estimate value dependence of the radar based precipitation estimate errors and storing the precipitation estimate value dependence in a precipitation error data repository;
using the digital weather computing system, obtaining a particular radar based precipitation estimate;
using the digital weather computing system, determining a particular precipitation estimate error for the particular radar based precipitation estimate based, at least in part, on the precipitation estimate value dependence of the radar based precipitation estimate errors;
using the digital weather computing system, displaying the particular radar based precipitation estimate and the radar based precipitation estimate error for the particular radar based precipitation estimate.

* * * * *